J. W. CULMER.
PIT-CAR OILING-CAP.

No. 175,941.          Patented April 11, 1876.

UNITED STATES PATENT OFFICE.

JOHN W. CULMER, OF PITTSBURG, PA., ASSIGNOR TO ROBERT R. GUMBERT.

IMPROVEMENT IN PIT-CAR OILING-CAPS.

Specification forming part of Letters Patent No. 175,941, dated April 11, 1876; application filed October 15, 1875.

*To all whom it may concern:*

Be it known that I, JOHN W. CULMER, of Pittsburg, in the county of Allegheny and State of Pennsylvania, have invented a new and useful Improvement in Pit-Car Oilers; and I do hereby declare the following to be a full, clear, and exact description thereof.

In mining-wagons or pit-cars it is at present requisite to oil the wheels at each trip from the mine. As the oiling is accomplished through an aperture in the hub, there is necessarily great waste, the major portion of the oil running off as soon as the wheel revolves.

While in the pit or mine loading, the dust falls upon the exposed axles outside the hub and through the oil-holes, and causes extraordinary wear. To obviate this, and to furnish sufficient oil to keep the axle lubricated for many journeys, I construct a dome-shaped cup as a reservoir, which I attach to the outer part of the hub, covering the end of the axle and linchpin and protecting them from the dust, and packed to be oil-tight at its joint with the hub. I secure this reservoir by means of screw-bolts and nuts, and feed it with oil by a central opening, as shown.

Figure 1:
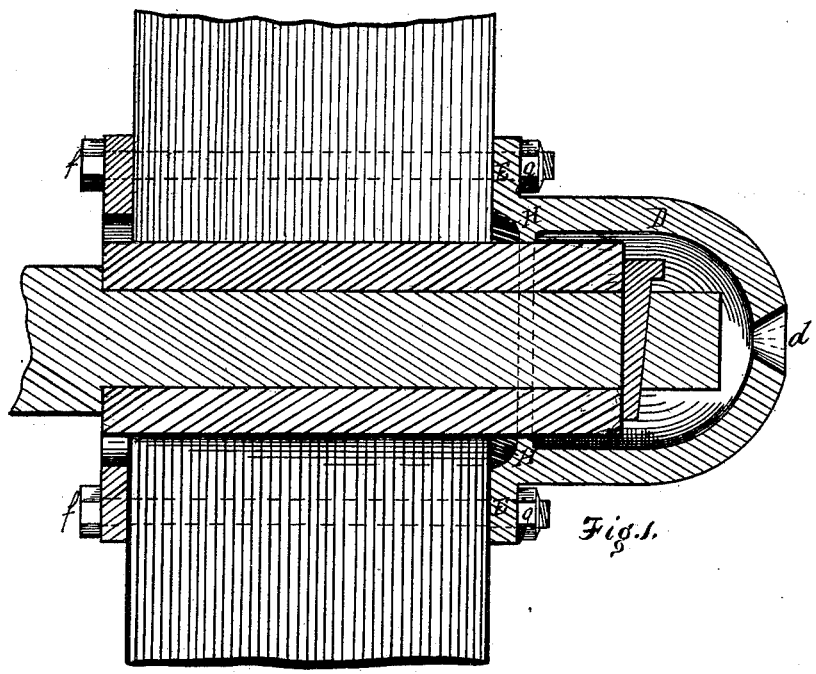
Figure 2:
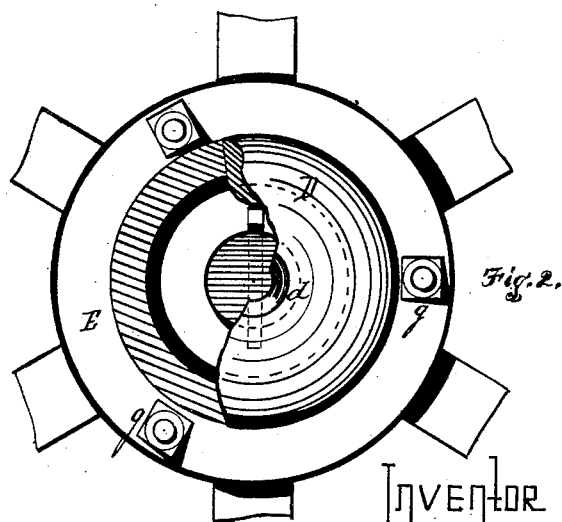

In the accompanying drawings, Figure 1 is a transverse sectional view of my invention attached to the hub of a wheel. Fig. 2 is a broken front view of the same, showing the relative positions of the parts.

D is the dome or reservoir; $d$, the oiling-opening. H is a packing-ring of any approved material; E, the flange for the admission of the screws $f$, which draw the dome tightly upon the packing-ring H by means of the nuts $g$.

When in use, the reservoir, continuously rotating with the wheel, throws the oil upon the face of the hub, whence it runs down the axle, sufficient being retained within the seat for perfect lubrication.

The oiling-opening $d$ I construct with a bevel outwardly to prevent the admission of dirt or dust falling from above, as the dust would have to move in a horizontal plane on the axial line of the wheel to gain admission to the reservoir, the inclined sides of the opening serving to deflect it when coming from any other direction.

Having thus described my invention, what I claim, and desire to secure by Letters Patent, is—

As an article of manufacture, the dome-shaped reservoir or oil-cap, having the outwardly-beveled central oiling-hole and base-flange provided with a packing-seat or depression whereby the cap may be attached to pit-car wheels of the common construction, by means of bolts or similar devices.

In testimony whereof I, the said JOHN W. CULMER, have hereunto set my hand.

JOHN W. CULMER.

Witnesses:
 WM. S. LAUGHLIN,
 R. R. GUMBERT.